(No Model.) 2 Sheets—Sheet 1.
T. R. MORGAN, Sr.
CLUTCH.
No. 293,060. Patented Feb. 5, 1884.
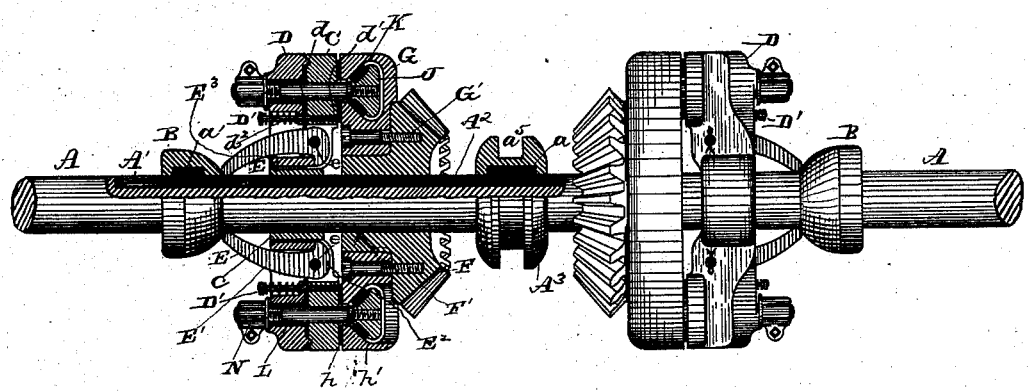
Figure 1.
Fig. 2.
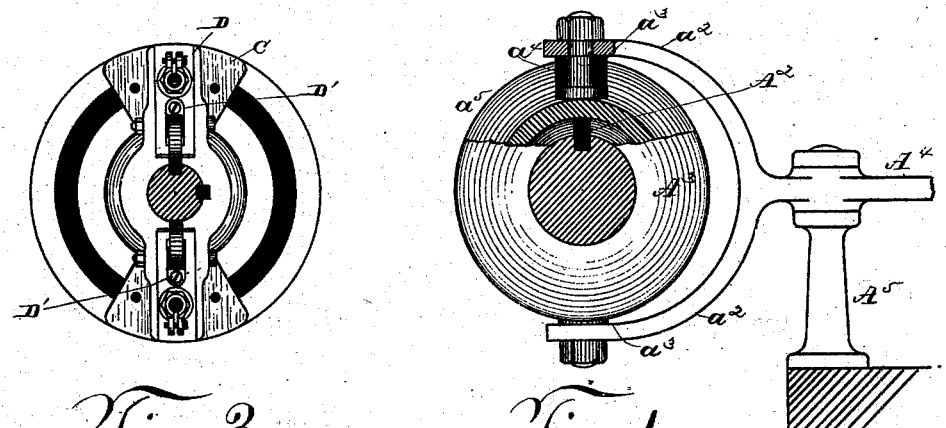
Fig. 3.   Fig. 4.
WITNESSES  Jno. R. Morgan   INVENTOR Thomas R. Morgan, Sr.
John H. Lloyd.
By H. A. Seymour
atty.

(No Model.) 2 Sheets—Sheet 2.
T. R. MORGAN, Sr.
CLUTCH.
No. 293,060. Patented Feb. 5, 1884.
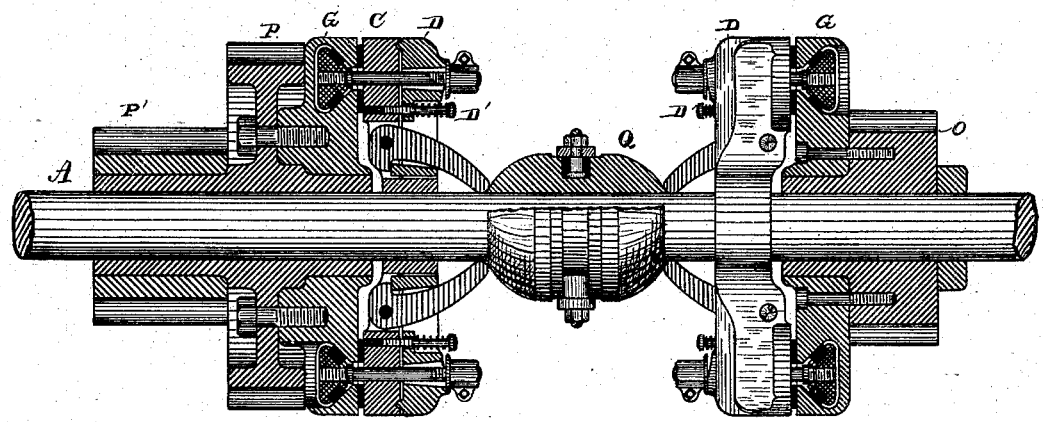
*Figure, 5.*
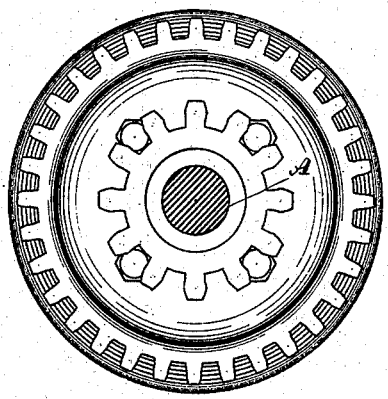 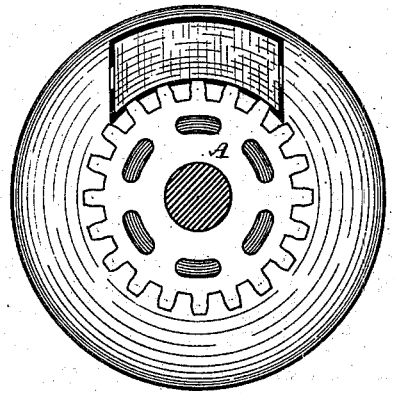
*Fig., 6.* *Fig., 7.*
WITNESSES Jno. R. Morgan  INVENTOR Thomas R. Morgan, Sr.
John H. Lloyd
By H. A. Seymour
Atty.

UNITED STATES PATENT OFFICE.

THOMAS R. MORGAN, SR., OF ALLIANCE, OHIO.

CLUTCH.

SPECIFICATION forming part of Letters Patent No. 293,060, dated February 5, 1884.

Application filed November 26, 1883. (No model.)

*To all whom it may concern:*

Be it known that I, THOMAS R. MORGAN, Sr., of Alliance, in the county of Stark and State of Ohio, have invented certain new and useful Improvements in Clutches; and I do hereby declare the following to be a full, clear, and exact description of the invention, such as will enable others skilled in the art to which it appertains to make and use the same.

My invention relates to an improvement in clutches, the object being to provide a friction-clutch of such construction that bevel or gear wheels or pinions of any desired size may be readily locked to the clutch and caused to rotate therewith and the shaft without imposing undue or uneven strains on the clutch, the frictional surfaces of the clutch being located at any desired distance from the shaft, and irrespective of the diameters of the bevel or gear wheels or pinions connected with the clutch. Another object is to provide a key, in connection with the shifting collar and clutches, so that by shifting a single key one clutch is locked and the other unlocked, or both may be disconnected from the shaft.

With these ends in view my invention consists in certain features of construction and combination of parts, as will hereinafter be described, and pointed out in the claims.

In the accompanying drawings, Figure 1 is a view, partly in side elevation and partly in longitudinal section, of a clutch embodying my invention. Fig. 2 is a side elevation of the double key. Fig. 3 is an end view of one of the clutches. Fig. 4 is a view, partly in end elevation and partly in transverse section, of the shifting collar and lever of the clutch. Figs. 5, 6, and 7 represent a modification.

A represents a shaft, from which it is desired to transmit motion in opposite directions to another shaft. A longitudinal groove, A', is formed in the shaft A, in which is placed the sliding key $A^2$, which latter is constructed with the central projection, $a$, and the end projections, $a'$ $a'$, as clearly illustrated in Fig. 2.

$A^3$ is a collar or sleeve loosely secured on the shaft, and provided with a recess, in which is received the central projection, $a$, of the sliding key, whereby the latter is moved in either direction by sliding the collar or sleeve back and forth on the shaft.

$A^4$ is a shifting-lever journaled on a post or stud, $A^5$, and constructed with a forked end, in the arms $a^2$ $a^2$ of which are secured the pins or studs $a^3$, on which are mounted the anti-friction rollers $a^4$, that engage in the annular groove $a^5$, formed in the periphery of the collar or sleeve.

To the outer end of the sliding key $A^2$ are secured the conical collars or sleeves B B, by means of the end projections, $a'$ $a'$, on the key engaging in the correspondingly-formed recesses in said collars. Thus, by operating the shifting-lever $A^4$ the sliding key is moved in either direction, carrying with it the conical collars or sleeves B B.

To the shaft A is rigidly secured the cross-bar C of each clutch, by a sleeve, $c$, that is firmly attached to the shaft, thereby causing them to rotate therewith. Each cross-bar C has connected therewith a yielding face-plate, D, by means of screws D', that extend through openings $d$ in the face-plate and into screw-threaded sockets $d'$ in the cross-bars. Spiral springs $d^2$ encircle the outer and projecting ends of the screws, the outer ends of said springs resting against the heads of the screws, while the opposite ends bear against the face-plate, thus serving to force the latter in a yielding manner against the cross-bar C. Curved levers E E are pivoted at $e$ $e$ to the cross-bars, the long curved arms E' of the levers being arranged to engage the conical surface of the collar B, while the short arm $E^2$ engages the sleeve or projection $E^3$ on the face-plate D. Bevel-wheel F is loosely mounted on the shaft A, and is provided with a sleeve, F', on which is placed the clutch-disk G, which is secured by means of the screws G' entering screw-threaded openings formed in the rear face of the bevel-wheel. Clutch-disk G is provided with an annular groove, which is undercut and formed with converging walls $h$ $h'$. Within the annular grooves $h$ are placed the triangular-shaped blocks J, having recesses in their converging faces, in which are removably secured the wearing-surfaces K. Through openings in the cross-bar C and face-plate D are inserted the bolts L, having secured to their inner ends the blocks G, and to their outer ends the lock-nuts N. When the shifting collar or sleeve $A^3$ is moved toward the right, the conical collar or sleeve B will engage the long arms E' of the levers E, forcing said arms outwardly, the effect of which is to force the clutch-disk G toward the cross-bar C, and thereby cause the friction blocks or plates K, attached to the inner face of the cross-bar C, to engage the adjacent face of the disk G and form a locking-surface therewith. At the same time the levers E also operate to draw the bolts L outwardly and cause the friction-surfaces on the friction-blocks J to engage and become locked to the converging walls of the annular groove in the clutch-disk G. Thus it will be observed that the clutch-disk, which is attached to the bevel-pinion, is firmly locked to the cross-bar of the clutch by the frictional locking-surface between the clutch-disk and the cross-bar and the locking-surfaces within the annular groove. When the clutch is operated in the manner described, the other clutch is operated simultaneously therewith, but in an opposite direction, so as to release the bevel-wheel from the shaft A. When the grooved or shifting collar $A^3$ is moved in the opposite direction, the long arms E of the clutch-levers are allowed to approach each other, and thereby permit the spiral spring referred to to draw the face-plate D toward the cross-bar C and release both sets of friction surfaces or plates from contact with the disk G. Thus it will be observed that the bevel-wheels may be readily and firmly locked to the clutch to revolve therewith; that upon locking one bevel-wheel to the clutch the other wheel is simultaneously disconnected from its clutch, while by adjusting the shifting collar $A^3$ equidistant from the two bevel-wheels the latter are both disengaged from their clutches.

One important feature of the invention consists in the construction of parts whereby the frictional locking-surfaces are not dependent on the area or size or form of the bevel-wheels. If it is desired, bevel-wheels of small diameter may be employed, and yet a powerful locking-action of the clutch insured by the employment of a clutch-disk and its accompanying devices of sufficient diameter and area to insure an extended frictional locking-surface. The bevel-wheels mesh into a bevel-wheel located between them and at right angles thereto; and hence, when one of the bevel-wheels of the clutch is locked to the shaft to rotate therewith said driven bevel-wheel will be rotated in one direction, and will be rotated in the opposite direction by locking the other bevel-wheel of the clutch to the shaft.

In Figs. 5, 6, and 7 I have represented a modified construction of the clutch, whereby I employ the same construction and arrangement of frictional surfaces and operating mechanism; but instead of connecting bevel-wheels to the clutch there is secured to one of the clutch-disks a pinion, O, and to the opposite clutch-disk the gear-wheel P and pinion P', the latter being secured upon a sleeve cast integral with the gear-wheel P. In this modified construction of parts the shifting collar or sleeve Q is provided with conical surfaces on its opposite ends for operating the clutch-levers.

It is evident that many changes may be made in the construction and arrangement of parts without departing from the spirit of my invention; and hence I will not limit myself to the exact construction and arrangement of parts shown and described; but, Having fully described my invention, what I claim as new, and desire to secure by Letters Patent, is—

1. The combination, with two clutches, of a sliding key having conical collars secured to its opposite ends, and a shifting collar and lever for simultaneously locking one clutch and releasing the other, substantially as set forth.

2. The combination, with two clutches having bevel or gear wheels or pinions connected therewith, of a shifting collar or sleeve and a sliding key for simultaneously locking and unlocking said clutches, substantially as and for the purpose set forth.

3. The combination, with a pinion, bevel, or gear wheel loosely mounted on a shaft, and a clutch-disk secured thereto, of a cross-bar keyed to the shaft, a face-plate secured in a yielding manner to said cross-bar, and a sliding collar and levers for operating said face-plate, substantially as and for the purpose set forth.

4. The combination, with a bevel-wheel, gear-wheel, or pinion loosely mounted on a shaft and having a clutch-disk secured thereto, the latter being provided with an annular groove, of a cross-bar keyed to said shaft, a face-plate secured to the cross-bar in a yielding manner, and bolts extending through the face-plate and cross-bar, and provided with friction-blocks that engage in the annular groove in the clutch-disk, substantially as and for the purpose set forth.

5. The combination, with the bevel-wheel F, clutch-disk G, provided with the annular groove H, of the cross-bar C, face-plate D, bolts L, levers E, conical blocks B, and the friction-surfaces K N, substantially as and for the purpose set forth.

6. The combination, with the bevel-wheel F, and the clutch-disk secured to the rear side of said wheel, of the clutch mechanism constructed and arranged to be engaged with and disengaged from said disk, and a sliding key passing through the sleeve of the bevel-wheel for operating the clutch, substantially as set forth.

In testimony whereof I have signed this specification in the presence of two subscribing witnesses.

THOMAS R. MORGAN, SR.

Witnesses:
JOHN H. LLOYD,
SAM. S. WEBB.